(12) United States Patent
Vollkommer et al.

(10) Patent No.: US 6,225,758 B1
(45) Date of Patent: May 1, 2001

(54) METHOD FOR PRODUCING IMPULSE VOLTAGE SEQUENCES TO OPERATE DISCHARGE LAMPS AND CIRCUIT PERTAINING THERETO

(75) Inventors: Frank Vollkommer, Buchendorf; Lothar Hitzschke, Munich, both of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/254,954

(22) PCT Filed: Jul. 16, 1998

(86) PCT No.: PCT/DE98/01997

§ 371 Date: Mar. 22, 1999

§ 102(e) Date: Mar. 22, 1999

(87) PCT Pub. No.: WO99/08490

PCT Pub. Date: Feb. 18, 1999

(30) Foreign Application Priority Data

Aug. 12, 1997 (DE) ............................................. 197 34 883

(51) Int. Cl.[7] ..................................................... G05F 1/00
(52) U.S. Cl. ........................ 315/291; 315/246; 315/260; 313/607
(58) Field of Search ..................................... 315/291, 246, 315/224, 260, 271, 169.1; 313/484, 491, 489, 607

(56) References Cited

U.S. PATENT DOCUMENTS 5,111,118    5/1992   Fellows et al. .
5,604,410 *  2/1997   Vollkommer ........................ 315/246
5,831,394 * 11/1998   Huber et al. ........................ 315/224
5,965,988 * 10/1999   Vollkommer et al. ............... 315/246
5,977,722 * 11/1999   Yokokawa et al. .................. 315/207

FOREIGN PATENT DOCUMENTS 19548003     6/1997   (DE) .
0048977 *    7/1982   (EP) .
9423442     10/1994   (WO) .

OTHER PUBLICATIONS

Patent Abstracts of Japan, vol. 010, No. 009 (P–420), Jan. 14, 1986 & JP 60 165537 A (Oki Denki Kogyo KK), Aug. 28, 1985 (Abstract).
Patent Abstracts of Japan, vol. 096, No. 010, Oct. 31, 1996 & JP 08 145889 A (Shimadzu Corp), Jun. 7, 1996 (Abstract).

* cited by examiner

*Primary Examiner*—Don Wong
*Assistant Examiner*—Ephrem Alemu
(74) *Attorney, Agent, or Firm*—Carlo S. Bessone

(57) ABSTRACT

A method for producing pulsed-voltage sequences for the operation of discharge lamps (8) by means of a pulsed discharge which is impeded dielectrically provides for some of the required pulse peak values to be replaced by an offset DC voltage component ($U_{DC}(t)$). This has, inter alia, the advantage that correspondingly less EMI is generated when the pulsed-voltage sequences ($U_p(t)$) are produced. It is also provided for a portion of the electrical real power injected into the discharge predominantly throughout the duration of the voltage pulses to be injected on the basis of the offset DC voltage ($U_{DC}(t)$). For this purpose, a circuit arrangement provides a series circuit comprising a pulse circuit (1) and a DC voltage circuit (2), in which case the pulse circuit (1) can be designed for a power level.

10 Claims, 2 Drawing Sheets

METHOD FOR PRODUCING IMPULSE VOLTAGE SEQUENCES TO OPERATE DISCHARGE LAMPS AND CIRCUIT PERTAINING THERETO

TECHNICAL FIELD

The invention relates to a method for producing pulsed-voltage sequences for the operation of discharge lamps by means of a pulsed discharge, which is impeded dielectrically. The invention also relates to an electrical circuit arrangement for producing pulsed-voltage sequences according to this method. Finally the invention also relates to a lighting system with this circuit arrangement.

The term "discharge lamp" is also intended to cover those radiation sources which, in addition to electromagnetic radiation in the visible spectral band, that is to say light, also or even predominantly emit radiation in the UV or VUV bands.

The pulsed-voltage sequence can in principle be both unipolar and bipolar and is used for operating discharge lamps or radiators in which at least the electrodes of one polarity are impeded dielectrically, as is described, for example, in WO 94/23442. This method of operation uses a sequence, which is in principle unlimited, of voltage pulses during which predominantly electrical real power is injected, and which are separated from one another by pauses. The critical factors for the efficiency of the useful radiation production are, essentially, the pulse shape, in particular steep rises, as well as the time durations of the pulse times and pauses. The required peak values of the voltage pulses are typically one to several kilovolts—depending, inter alia, on the flash-over distance, on the nature and the pressure of the filling gas, as well as on the nature and the thickness of the dielectric.

PRIOR ART

The document DE 195 48 003 A1 has already disclosed such a circuit arrangement for producing pulsed-voltage sequences having one pulse circuit. This pulse circuit essentially comprises a capacitor, a transistor and a pulse transformer. During the phase when the transistor is switched on, the energy stored in the capacitor is transferred to the pulse transformer. In the process, the pulse transformer transforms the pulsed voltage to the required peak values, although a number of disadvantages are associated with this. Firstly, the pulse transformer must be designed for the peak value of the pulsed-voltage sequence and is thus relatively large and expensive. In addition, the pulse load on the pulse transformer is relatively large and the winding capacitances, which are likewise relatively large, have an adverse effect on the pulse shape. A further disadvantage is that the full peak value of the pulsed-voltage sequence occurs on the supply leads of the secondary winding of the pulse transformer. The parasitic capacitances to the environment which are always present result in relatively high interference signals, so-called EMI (Electromagnetic Interference). In addition, all of the energy consumption required for each discharge pulse is taken entirely from the pulse circuit, for which reason it must be designed appropriately.

DESCRIPTION OF THE INVENTION

The object of the present invention is to avoid the said disadvantages and to provide a method that produces a pulse sequence which ensures more efficient energy provision for the discharge, which is operated in a pulsed manner and is impeded dielectrically. A further aspect is to produce less EMI.

A further object of the present invention is to provide a circuit arrangement for implementing this method.

Finally, it is an object of the present invention to provide a corresponding lighting system.

The basic idea of the invention is to replace some of the pulse peak values required for pulsed discharges which are impeded dielectrically, by an offset DC voltage component, a portion of the electrical real power injected into the discharge(s) predominantly throughout the duration of the voltage pulses also being injected on the basis of the offset DC voltage component.

To do this, at least one offset DC voltage and a sequence of voltage pulses are additively superimposed to form a total voltage, in such a manner that the offset DC voltage component virtually forms the "base" of the total voltage on which the sequence of voltage pulses is placed. In this way, the peak values of the total voltage result from the sum of the value of the offset DC voltage and of the peak values of the voltage pulses. In consequence, with the aid of the superimposition according to the invention, voltage pulses with lower peak values than those without superimposition are sufficient to achieve the required level of effective peak values.

The total amplitude of the offset DC voltage is in this case deliberately chosen to be at most sufficiently high that the discharge(s) can be extinguished after each voltage pulse. This requirement must be satisfied in order to provide the efficient method of operation described in WO 94/23442.

The individual pulses of the sequence of voltage pulses can be unipolar as well as bipolar. The term "bipolar pulse" means that, within such a pulse, the time-dependent voltage changes the sign once or several times. By superimposing a sequence of bipolar pulses on an offset DC voltage it is possible to produce also a bipolar overall voltage.

In addition, the invention provides a source which supplies the offset DC voltage and which is suitable for providing a portion of the electrical real power injected into the discharge(s) predominantly throughout the duration of the voltage pulses. This has the advantage that the pulse source has to supply only the remaining portion of the power required for the discharge which is operated in a pulsed manner and is impeded dielectrically, and is therefore designed only for correspondingly lower power levels.

The method according to the invention for producing pulsed-voltage sequences for the operation of discharge lamps by means of (a) pulsed discharge(s) which is(are) impeded dielectrically provides the following method steps.

At least one offset DC voltage is provided, in which case the total amplitude of the offset DC voltages is in this case deliberately chosen to be at most sufficiently high that the discharge(s) can be extinguished after each voltage pulse and undesirable restriking between the individual voltage pulses is prevented.

A sequence of voltage pulses, which are separated from one another by pauses, is provided, the polarity of the sequence being opposite the polarity of the offset DC voltage with respect to a common potential.

The at least one offset DC voltage and the sequence of voltage pulses are superimposed to form a total voltage in such a manner that the peak values of the total voltage result from the sum of the magnitude of the offset DC voltage and of the magnitude of the peak values of the voltage pulses (additive superimposition of magnitudes).

The total voltage produced in this way is applied to the electrodes for use according to the invention.

Owing to the lower required pulse level of the sequence of voltage pulses, it is sufficient to design the pulse circuit for lower peak values, and this results in a number of further significant advantages. First of all, a lower transformation ratio is sufficient for the pulse transformer which is normally present in the pulse circuit, or it may be possible to dispense with the pulse transformer completely. In either case, steeper pulse flanks can be achieved, which results in an increase in the efficiency of the useful radiation production. Furthermore, the reduction in the level of the voltage pulses also achieves a reduction in the EMI and in the current in the primary circuit of the pulse transformer.

The circuit arrangement according to the invention for producing pulsed-voltage sequences according to the method described above comprises a pulse circuit and a DC voltage circuit, each having two output poles.

One of the two output poles of the pulse circuit is connected to the output pole of opposite polarity of the DC voltage circuit. The connection of the two said output poles defines the reference-earth potential with respect to the two free output poles of the two series-connected circuits. In this way, the difference signal of the two partial signals which are in each case present between a free output pole and the reference-earth potential is present between the two free output poles, that is to say the additive superimposition of the magnitudes of the pulsed-voltage sequence and of the offset DC voltage is present between the two free output poles. The reference-earth potential may be, but need not necessarily be, connected to the circuit earth or to earth potential.

The pulse circuit is, for example, in each case constructed according to the circuit disclosed in DE 195 48 003 A1. The specific design of the pulse circuit is based in the specific case on the required peak values at the electrodes. The advantageous effect of the circuit is primarily governed by the necessity to ensure that the pulse circuit is suitable for supplying a partial sequence of voltage pulses which are separated from one another by pauses.

In addition, the pulse circuit may comprise two or more series-connected partial pulse circuits. In this way, the pulsed-voltage sequence is additively composed of the magnitudes of two or more partial sequences. In this way, only correspondingly lower peak values need be produced for the partial sequences in each case in order from them to achieve the required peak value of the resultant pulsed-voltage sequence.

In the simplest case, the DC voltage circuit is a battery or an electronic DC voltage circuit known per se. The advantageous effect of the circuit in this case is governed primarily by the necessity to ensure that the DC voltage circuit is suitable for supplying an offset DC voltage. In addition, the electrical power capability of the DC voltage circuit is advantageously designed such that a significant proportion, for example more than about 20%, of the electrical power required for the discharge(s) is supplied by the DC voltage circuit.

The advantage over the prior art in this case is that the cross section of the wire for the windings of the pulse transformer and/or of the transformer core may be chosen to be smaller. In addition, the transformation ratio and, in consequence, the turns ratio of the pulse transformer required for a peak voltage which can be predetermined is lower than in the case of the prior art. This results in the further advantage that steeper voltage pulse flanks and, in consequence, higher efficiency of useful radiation production can be achieved.

In addition, in many cases in which until now it has been essential to use a transformer, it is possible to completely dispense with the use of a transformer since, according to the invention, some of the required peak voltage is provided by the DC voltage circuit.

Furthermore, a switch can be fitted between the at least one DC voltage circuit and the corresponding connecting lead to the radiation source. The switch (or possibly the switches) is(are) synchronized to the pulse circuit in such a manner that the switch (or switches) is(are) closed throughout the duration of the voltage pulses and is(are) open throughout the duration of the pauses. This prevents the offset DC voltage(s) from being applied to the electrodes during the pauses. In contrast to the pulse circuit, the switch itself need not be particularly fast. Switching times in the region of several $\mu s$, for example 5 $\mu s$, are sufficient. The switching time is taken into account by a corresponding lead time in the synchronization, in such a manner that the offset DC voltage is present at the electrodes as soon as the voltage pulse starts.

Finally, protection is claimed for a lighting system which comprises the circuit arrangement according to the invention and a radiation source which is operated by means of a pulsed discharge, which is impeded dielectrically.

DESCRIPTION OF THE DRAWINGS

The invention will be explained in more detail in the following text with reference to an exemplary embodiment. In the drawings.

DESCRIPTION OF THE PREFERRED EMBODIMENTS

Figure 1:
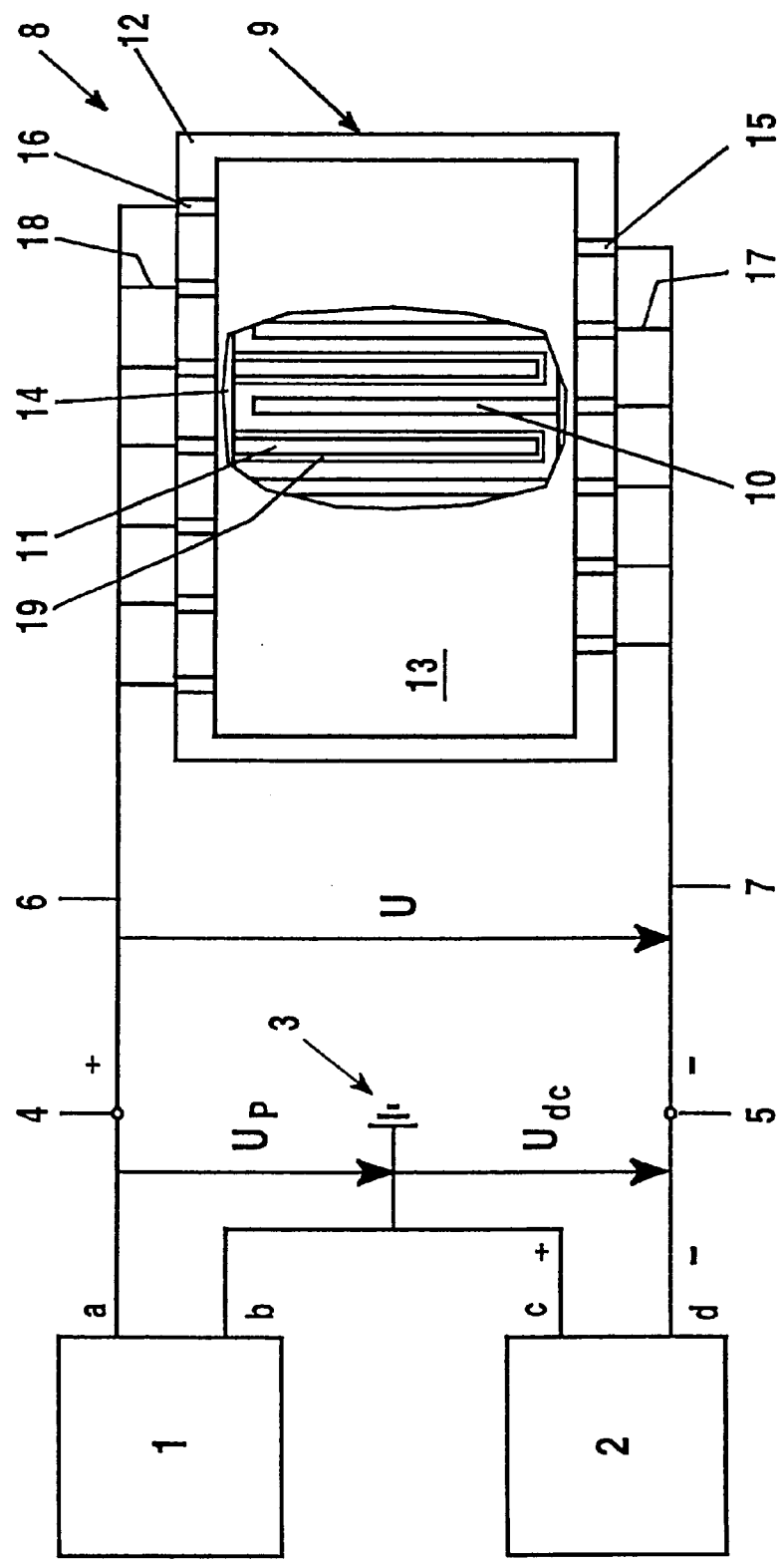
FIG. 1 shows a circuit arrangement according to the invention with a flat radiator.

FIG. 1 shows, as a schematic illustration, the block diagram of the circuit arrangement according to the invention for producing pulsed-voltage sequences, and a flat radiator. The circuit arrangement essentially comprises a pulse circuit 1 and a DC voltage circuit 2. Each of the two circuits each has two output poles a, b; c, d. In operation, the pulse circuit 1 supplies a pulsed-voltage sequence $U_p(t)$ between its output poles a, b. The DC voltage circuit 2 supplies an offset DC voltage $U_{DC}$ between its output poles c, d. The positive (+) output pole a of the pulse circuit 1 and the negative (−) output pole d of the DC voltage circuit 2 are connected to connections 4 and 5, respectively. The connections 4 and 5, respectively, are for their part connected via supply leads 6, 7 to the flat radiator 8. The respective free output poles b; c of the two circuits 1, 2 are connected to one another and to earth potential (3), which is used as the reference-earth potential. In consequence, the two circuits 1, 2 are connected in series and difference voltage sequence U(t) is produced in operation between the positive (+) output pole a of the pulse circuit 1 and the negative (−) output poled of the DC voltage circuit 2.

The flat radiator 8 comprises a discharge vessel 9, cathodes 10 in the form of strips and anodes 11 in the form of strips, which are impeded dielectrically. The discharge vessel 9 comprises a base plate 12, a cover plate 13 and a frame 14, all of which have a rectangular base area. The base plate 12 and the cover plate 13 are connected in a gas-tight manner to the frame by means of glass solder, in such a manner that the interior of the discharge vessel 9 is formed in a cuboid shape. The base plate 12 is larger than the cover plate 13, such that the discharge vessel 9 has a free-standing rim all-round. The cathodes 10 and anodes 11 are arranged alternately and parallel to one another at a mutual separation of about 6 mm on the inner wall of the base plate 12. The cathodes 10 and anodes 11 are lengthened at mutually opposite ends and are passed out of the interior of the discharge vessel 9, to the outside, on the base plate 12 on both sides. On the rim of the base plate 12, the cathodes 10 and anodes 11 respectively merge into external electrical supply leads on the cathode side 15 and on the anode side 16, respectively. The external electrical supply leads 15, 16 are respectively connected by means of a short connecting piece 17, 18 to the supply leads 6, 7.

The aperture in the cover plate 13 serves only for illustrative purposes and makes it possible to see some of the anodes 11 and cathodes 10. In the interior of the discharge vessel 9, the anodes 11 are completely covered by a glass layer 19, whose thickness is about 250 $\mu$m. The electrodes 10; 11 and external contacts 15; 16 are produced as different sections of a cathode-side silver layer structure and an anode-side silver layer structure, which are applied jointly by means of a screen-printing technique, and subsequent burning-in. The layer thickness is about 6 $\mu$m.

In one variant (not illustrated), the pulse circuit is produced by connecting two partial pulse circuits in series.

In a further variant (not illustrated), a switch is fitted in the connecting leads (which are connected to the DC voltage source) for the radiation source, and this switch is synchronized to the pulse circuit in such a manner that the switch is closed throughout the duration of the voltage pulses and is open throughout the duration of the pauses. This avoids the offset DC voltage being applied to the electrodes during the pauses.

Figure 2A:
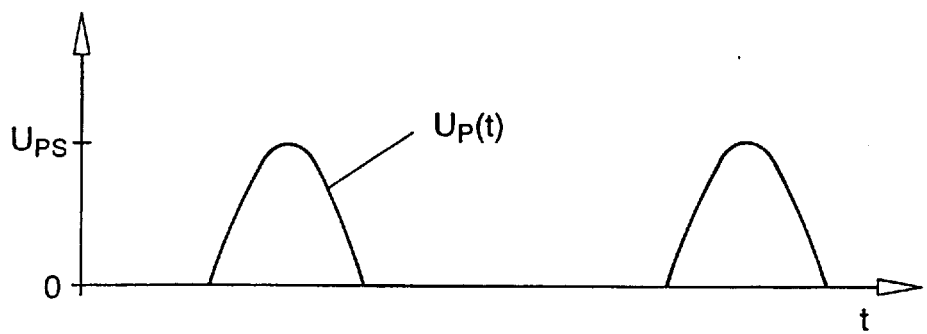
FIG. 2a shows a time detail of the pulsed-voltage sequence $U_p(t)$ from FIG. 1.
Figure 2B:
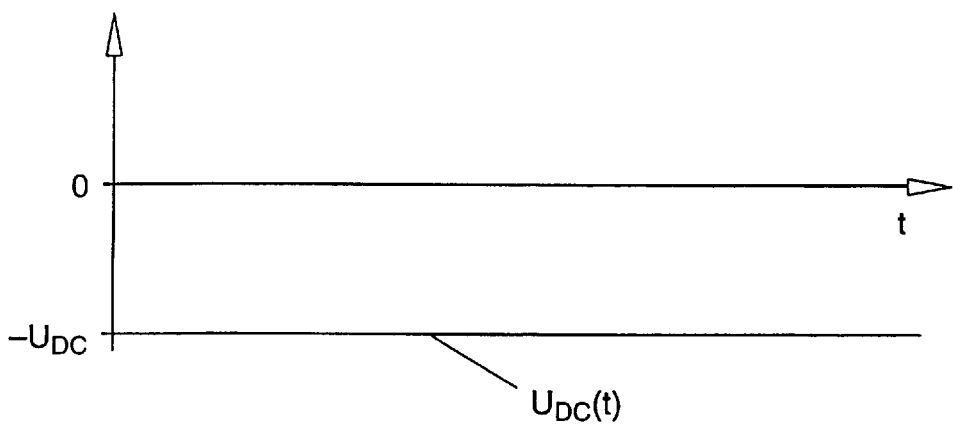
FIG. 2b shows a time detail of the offset DC voltage $U_{DC}(t)$ from FIG. 1.
Figure 2C:
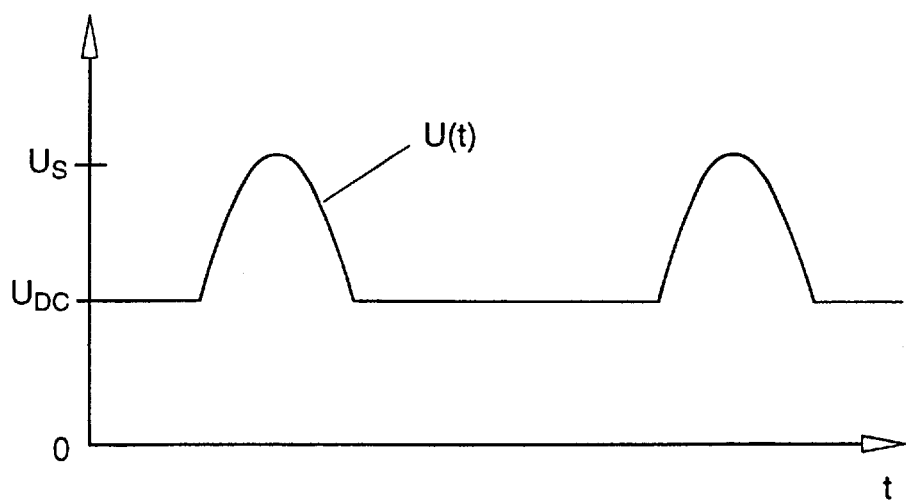
FIG. 2c shows a time detail of the difference voltage sequence U(t) from FIG. 1.

FIGS. 2a to 2c respectively show time details of the pulsed-voltage sequence $U_p(t)$ and of the offset DC voltage $U_{DC}(t) = -U_{DC}$ as well as the difference sequence $U(t)$ from FIG. 1 schematically and by way of example. The illustration shows two half-sinusoidal voltage pulses with the respective peak value $U_{PS}$, the offset DC voltage $-U_{DC}$ and the difference signal $U(t)$ from the two abovementioned signals, whose peak value $U_s$ is given by $|U_s|=|U_{PS}|+|U_{DC}|$, that is to say the total signal in FIG. 2c is an additive superimposition of the magnitudes of the individual signals from FIGS. 2a and 2b.

At this point, it should once again be mentioned that, in FIG. 2a, the signal waveform of the pulsed-voltage sequence $U_p(t)$ has only an exemplary character. According to the invention, in particular all signal waveforms which are disclosed in WO 94/23442 are suitable and can be produced by means of the circuit arrangement, including bipolar pulse waveforms (one or more sign changes within the pulses).

What is claimed is:

1. Method for producing pulsed-voltage sequences for the operation of discharge lamps (8) by means of (a) pulsed discharge(s) which is (are) impeded dielectrically, having
   an at least partially transparent discharge vessel (9), which is closed and filled with a gas filling or is open and has a gas or a gas mixture flowing through it and is composed of electrically non-conductive material, and
   electrodes (10, 11) of a first polarity and of a second polarity, at least the electrodes (11) of one polarity being isolated from the interior of the discharge vessel by means of dielectric material (19), and having the following method steps,
   providing at least one offset DC voltage ($U_{DC}(t)$), the amplitude ($U_{DC}$) of the offset DC voltage ($U_{DC}(t)$) or, possibly the resultant total amplitude of all the offset DC voltages being deliberately chosen to be at most sufficiently high that the discharge(s) can be extinguished after each voltage pulse and undesirable restriking between the individual voltage pulses is prevented,
   providing a sequence of voltage pulses ($U_p(t)$), which are separated from one another by pauses, the polarity of the sequence ($U_p(t)$) being opposite the polarity of the at least one offset DC voltage ($U_{DC}(t)$) with respect to a common potential (3),
   superimposition the at least one offset DC voltage ($U_{DC}(t)$) and the pulsed-voltage sequence ($U_p(t)$) to form a total voltage ($U(t)$) in such a manner that the peak values ($U_S$) of the total voltage ($U(t)$) correspond to the sum of the respective magnitudes of the peak values ($U_{DC}$, $U_{PS}$) of the at least one offset DC voltage ($U_{DC}(t)$) and of the pulsed-voltage sequence ($U_p(t)$), that is to say $|U_S|=|U_{DC}|+|U_{PS}|$,
   applying of the total voltage ($U(t)$) to the electrodes (10, 11),
a portion of the electrical real power injected into the discharge(s) predominantly throughout the duration of the voltage pulses being injected on the basis of the offset DC voltage ($U_{DC}(t)$).

2. Method according to claim 1, characterized by an additional method step in which, during each of the pauses, the offset DC voltage is pulsed at the common reference-earth potential.

3. Method according to claim 1, characterized in that the portion of the electrical real power injected on the basis of the offset DC voltage ($U_{DC}(t)$) is more than about 20%.

4. Method according to claim 3, characterized by an additional method step in which, during each of the pauses, the offset DC voltage is pulsed at the common reference-earth potential.

5. Method according to claim 1, characterized in that the sum ($|U_S|$) of the amplitude ($|U_{DC}|$) of the offset DC voltage ($U_{DC}(t)$) and the peak values ($|U_{PS}|$) in the sequence of voltage pulses ($U_p(t)$) is of approximately equal magnitude to, or is greater than, the striking voltage of the discharge(s).

6. Method according to claim 5, characterized in that the portion of the electrical real power injected on the basis of the offset DC voltage ($U_{DC}(t)$) is more than about 20%.

7. Method according to claim 5, characterized by an additional method step in which, during each of the pauses, the offset DC voltage is pulsed at the common reference-earth potential.

8. Lighting system having
   a radiation source (8), in particular a discharge lamp, which radiation source (8) is suitable for a discharge which is impeded dielectrically, the radiation source (8) comprising the following:
   an at least partially transparent discharge vessel (9), which is closed filled with a gas filling or is open and has a gas or a gas mixture flowing through it and is composed of electrically non-conductive material, and
   electrodes (10, 11), at least the electrodes (11) of one polarity being isolated from the interior of the discharge vessel (9) by dielectric material (19),
   Pulsed-voltage source (1, 2) which is connected to the electrodes (10, 11) and is suitable for supplying voltage pulses which are separated from one another by pauses, characterized in that the pulsed-voltage source (1, 2) has a circuit arrangement having a pulse circuit (1) having two output poles (a, b), which pulse circuit (1) is suitable for supplying a sequence ($U_p(t)$) of voltage pulses which are separated from one another by pauses, a DC voltage circuit (2) having two output poles (c, d), which DC voltage circuit (2) is suitable for supplying an offset DC voltage ($U_{DC}$) and a portion of the electrical real power injected into the discharge(s) predominantly throughout the duration of the voltage pulses, and which DC voltage circuit (2) is connected in series with the pulse circuit (1) in such a manner that one of the two output poles (c) of the DC voltage circuit (2) is connected to the output pole (b) of opposite polarity of the pulse circuit (1), by which means the magnitudes ($|U_{PS}|$, $|U_{DC}|$) of the pulsed-voltage sequence ($U_P(t)$) and of the offset DC voltage ($U_{DC}$) are additively superimposed in each case.

9. Lighting system according to claim 8, characterized in that the sum ($|U_s|$) of the amplitude ($|U_{DC}|$) of the offset DC voltage ($U_{DC}(t)$) and the peak values ($|U_{ps}|$) in the sequence of voltage pulses ($U_p(t)$) is of approximately equal magnitude to, or is greater than, the striking voltage of the discharge (s).

10. Lighting system according to claim 8, characterized in that the portion of the electrical real power injected on the basis of the offset DC voltage ($U_{DC}(t)$) is more than about 20%.

* * * * *